United States Patent [19]
Ohsawa et al.

[11] Patent Number: 5,936,364
[45] Date of Patent: Aug. 10, 1999

[54] DRIVE CONTROL APPARATUS FOR BRUSHLESS MOTOR

[75] Inventors: Hiroshi Ohsawa; Shinichi Ohi; Kzuyoshi Horiuchi; Kouji Ando, all of Konan, Japan

[73] Assignee: Zexel Corporation, Tokyo, Japan

[21] Appl. No.: 09/018,967

[22] Filed: Feb. 5, 1998

[30] Foreign Application Priority Data

Feb. 6, 1997 [JP] Japan ................................. 9-038437

[51] Int. Cl.⁶ ........................................................ H02P 6/08
[52] U.S. Cl. .......................... 318/432; 318/254; 318/459
[58] Field of Search .................................. 318/138, 254, 318/432, 433, 439, 459

[56] References Cited

U.S. PATENT DOCUMENTS

| | | | |
|---|---|---|---|
| 5,287,044 | 2/1994 | Izawa et al. ............................ | 318/254 |
| 5,519,301 | 5/1996 | Yoshida et al. ......................... | 318/811 |
| 5,537,020 | 7/1996 | Couture et al. ......................... | 318/720 |

*Primary Examiner*—Bentsu Ro
*Attorney, Agent, or Firm*—Wenderoth, Lind & Ponack, L.L.P.

[57] ABSTRACT

A pulse width of a drive pulse of a brushless motor is modulated in correspondence to a setting signal for setting the rotation rate. Switching control for the current supplied to exciting coils is implemented by using an output signal from Hall elements for detecting the position of the rotor and the drive pulse. Correction of the pulse width of the drive pulse is implemented to ensure that the average voltage is maintained at a constant level even when the source voltage fluctuates so that stable rotation can be maintained over the entire rotation rate range even when the source voltage supplied to the brushless motor fluctuates and so that the fuse can be prevented from melting and the motor can be prevented from becoming damaged, which may otherwise be caused by a fluctuating source voltage.

6 Claims, 5 Drawing Sheets

DRIVE CONTROL APPARATUS FOR BRUSHLESS MOTOR

BACKGROUND OF THE INVENTION

The present invention relates to a drive control apparatus for a brushless motor that performs duty ratio control of the brushless motor by modulating the pulse width of a drive pulse in correspondence to the setting for the rotation rate.

Methods for controlling the speed of a brushless motor include the one disclosed in Japanese Unexamined Patent Publication No. H 5-34781, which implements speed control by changing the pulse width of a drive pulse supplied to the exciting coils in order to apply a rotating magnetic field to the rotor through pulse-width modulation (PWM), for instance. In this pulse-width modulation a triangular wave having a specific frequency and a threshold value corresponding to the rotation rate that has been set are compared with each other, and if the rotation rate setting is smaller, the pulse width (duty ratio) of the drive pulse is reduced to lower the rotating speed of the rotor, whereas if the rotation rate setting is larger, the pulse width (duty ratio) of the drive pulse is increased to raise the rotating speed of the rotor.

However, the structure described above has a problem in that, when the brushless motor is being driven at a given rotation rate setting, if the source voltage fluctuates for any reason, the actual rotation rate, too, fluctuates as a result. For instance, if the source voltage rises, the peak voltage of the drive pulse becomes higher even if there is no change in the duty ratio, and the rotation becomes faster due to an increase in the current supplied to the exciting coils. In contrast, if source voltage falls, since the peak voltage of the drive pulse becomes lower, the rotation slows down due to a reduction in the current supplied to the exciting coils.

In the low speed rotation range and the medium speed rotation range, such fluctuations in the source voltage will only result in less stable drive of the motor, but when the motor is rotating at high speed, if the source voltage shifts upward, an excess voltage is applied which may result in melting of the fuse or damage to the motor.

SUMMARY OF THE INVENTION

Accordingly, an object of the present invention is to provide a drive control apparatus for a brushless motor that is capable of maintaining stable rotation of the brushless motor over the entire rotating speed range and preventing melting of the fuse and damage to the motor caused by fluctuations in the source voltage, even if the source voltage supplied to the brushless motor fluctuates.

Thus, the present invention provides a drive control apparatus for a brushless motor comprising a rotor provided with permanent magnets, a stator provided with exciting coils wound around it for generating a rotating magnetic field in order to cause the rotor to rotate, and Hall elements for detecting the position of the rotor. The apparatus also includes a switching device that switches the direction of the current supplied to the exciting coils, a drive control device that implements switching control for the switching device by using output signals from the Hall elements and also controls the amount of current supplied to the exciting coils by using a drive pulse, a pulse-width modulation device that determines the pulse width of the drive pulse with a setting signal for setting the rotation rate of the rotor and modulates the pulse width by changing the setting signal and a pulse-width correction device that, when the source voltage fluctuates, corrects the pulse width of the drive pulse in order to maintain the average voltage of the drive pulse at a constant level.

In order to maintain the average voltage per unit cycle at a constant level, a structure may be adopted in which the pulse width of the drive pulse is corrected to become the width achieved by multiplying the pulse width corresponding to the setting signal by the reciprocal of the fluctuation rate of the source voltage.

Thus, when the source voltage shifts upward, the amplitude of the drive pulse is raised and the pulse width of the drive pulse is reduced by the pulse-width correction device whereas when the source voltage shifts downward, the amplitude of the drive pulse is lowered and the pulse width of the drive pulse is increased by the pulse-width correction device. This results in the product of the pulse width and the amplitude being constant regardless of fluctuations in the source voltage, and the average voltage is maintained at a constant level at all times to assure stable rotation.

A more specific structure that may be adopted in order to achieve the control apparatus described above may include a pulse-width modulation device that compares a triangular wave having a specific frequency with a threshold value corresponding to the setting signal and modulates the pulse width of the drive pulse by using a period of the triangular wave over which it exceeds the threshold value as a pulse width and by shifting the threshold value, and a pulse width device that detects fluctuations in the source voltage to form a correction quantity corresponding to the quantity of the fluctuation and performs correction of the threshold value using the correction quantity to shift the pulse width.

With this, when the voltage falls, since the peak voltage of the drive pulse becomes lower, the period of the triangular wave over which it exceeds the threshold value is expanded by correcting the threshold value downward by the quantity corresponding to the reduction in peak voltage, thereby increasing the pulse width of the drive pulse to equalize the average voltage to the average voltage before the fluctuation. In addition, when the voltage rises, since the peak voltage of the drive pulse increases, the period of the triangular wave over which it exceeds the threshold value is narrowed down by correcting the threshold value upward by the quantity corresponding to the increase in the peak voltage, thereby reducing the pulse width of the drive pulse to equalize the average voltage to the average voltage before the fluctuation.

In this structure, fluctuations in the source voltage may be detected by providing a circuit that generates a constant voltage and by comparing a voltage achieved by dividing the source voltage with a known ratio against the constant voltage.

It is to be noted that the control apparatus described above may be realized by detecting fluctuations in the source voltage and calculating the correction quantity for the threshold value in correspondence to the quantity of the fluctuation based upon a program provided in a microcomputer, or it may be constituted only of the electrical circuit without employing a microcomputer.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate a preferred embodiment. In the drawings.

DETAILED DESCRIPTION OF THE PREFERRED EMBODIMENT

The following is an explanation of an embodiment of the present invention in reference to the drawings.

Figure 1:
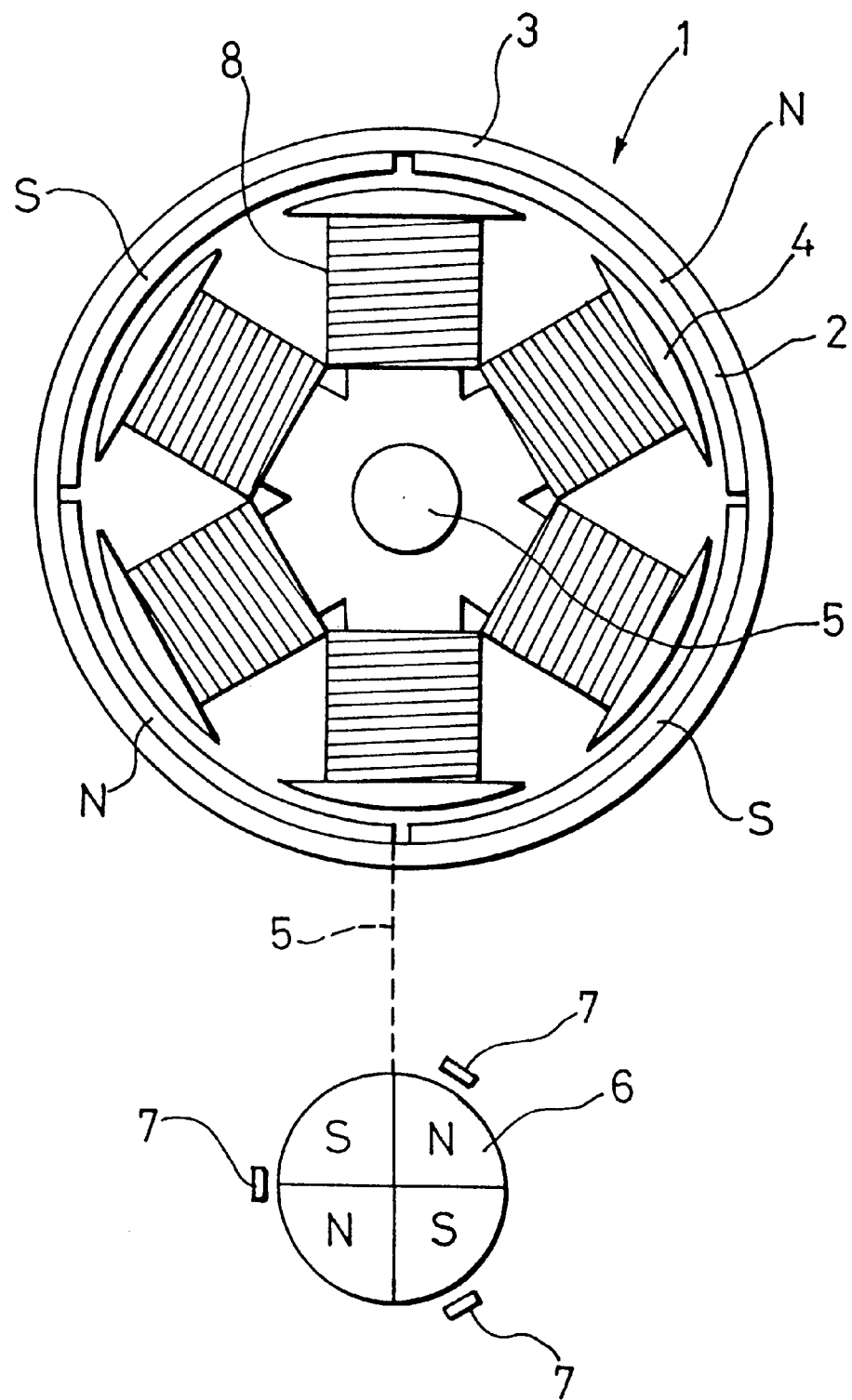
FIG. 1 is a schematic period diagram of an embodiment of the brushless motor according to the present invention.

FIG. 1 shows a three-phase brushless motor 1 which is controlled by the control apparatus for a brushless motor according to the present invention. This brushless motor 1 comprises a rotor 3 and a stator 4, with the rotor 3 caused to rotate by a rotating magnetic field generated at the stator 4 for the rotor 3 which is provided with permanent magnets 2. The permanent magnets are positioned in such a manner that their N poles and S poles are arranged alternately along the direction in which the rotor 3 rotates at the internal circumferential surface thereof facing opposite the external circumference surface of the stator 4. In addition, rotor magnets 6 for detecting the position of the rotor 3 are secured to one end of a rotating shaft 5 which, in turn, is secured to the rotor 3. Hall elements 7 that detect changes of the magnetic poles of the rotor magnets 6 are provided in the vicinity of the rotor magnets 6. Exciting coils 8 that are wound around the individual arms of the stator 4 comprise three exciting coils U, V and W and, in this embodiment, the three exciting coils U, V and W are delta-connected. It is to be noted that the exciting coils U, V and W may instead be star-connected.

Figure 2:
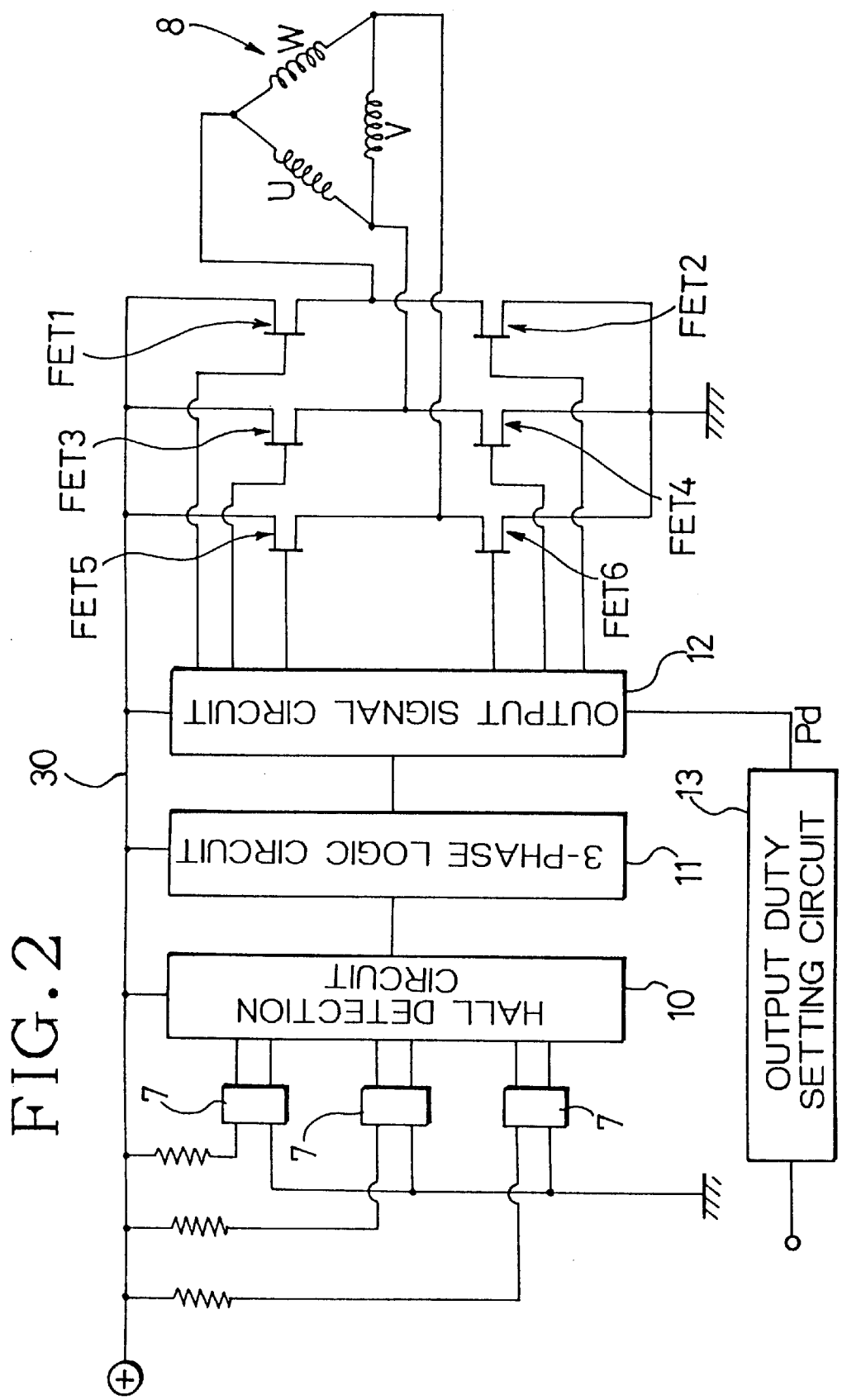
FIG. 2 is an electric circuit diagram illustrating a portion of the brushless motor control apparatus in the embodiment of the present invention.

The control apparatus that controls the brushless motor 1 structured as described above may be constituted as shown in FIG. 2. The control apparatus includes a Hall detection circuit 10 that detects signals from the Hall elements 7, a three-phase logic circuit 11 that sets the order in which power is supplied to the individual exciting coils U, V and W based upon a signal received from the Hall detection circuit 10 and an output signal circuit 12 that controls a switching device that switches the direction in which current is supplied to the exciting coils U, V and W using a power supply timing signal provided by the three-phase logic circuit 11 and an output duty signal Pd provided by an output duty setting circuit 13 which is to be detailed below. The switching device is constituted by providing three sets of field effect transistors in parallel between a source line 30 connected to a power supply such as a battery and ground, with each set comprising two field effect transistors that are connected in series between the source line 30 and ground, and with the individual terminals of the exciting coils U, V and W that are delta-connected respectively connected between the serially connected field effect transistors, i.e., between the FETs 1 and 2, between FETs 3 and 4, and between FETs 5 and 6.

Figure 3:
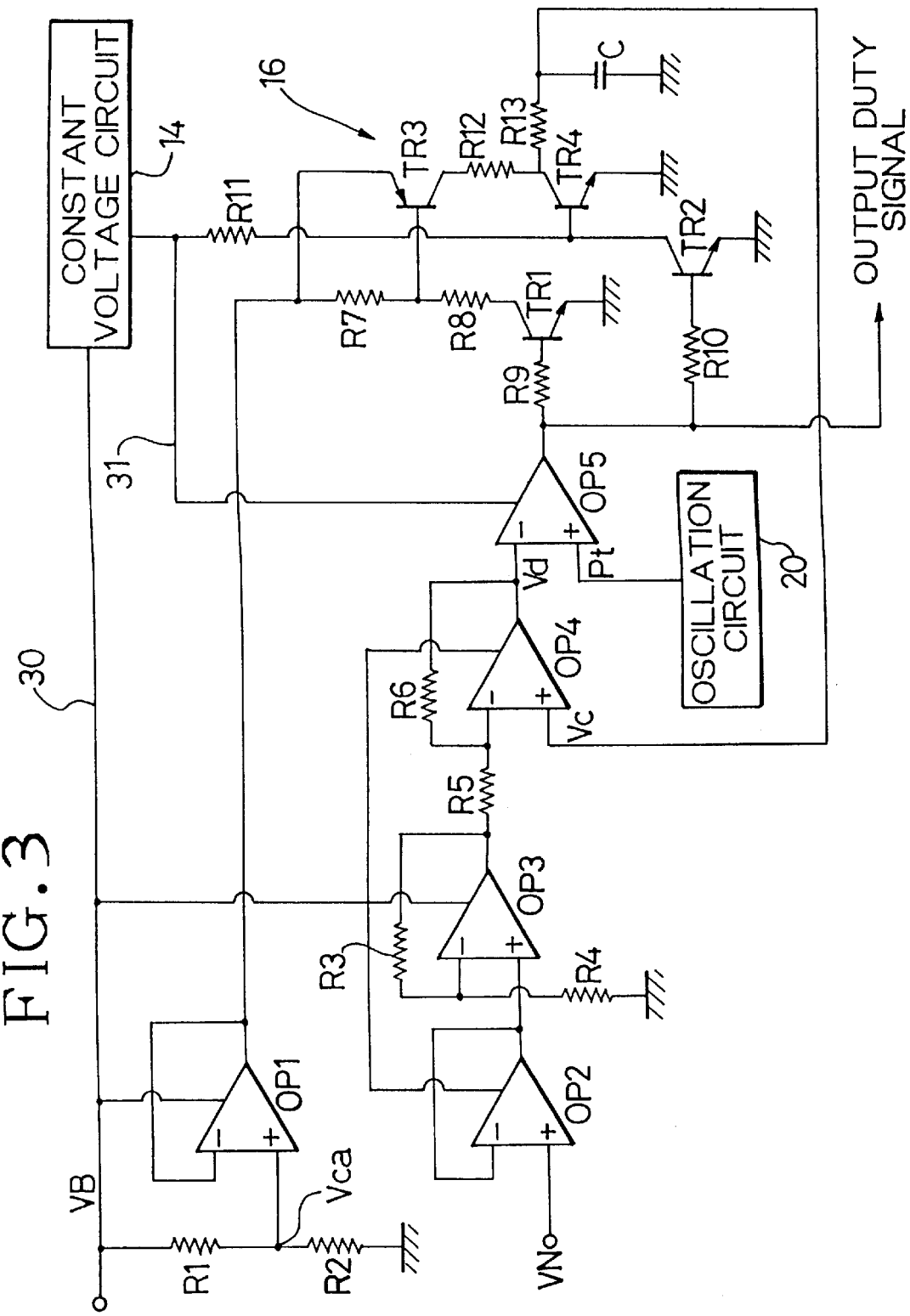
FIG. 3 is an electric circuit diagram of the source voltage correction circuit.

The output duty setting circuit 13 may be structured, for instance, as shown in FIG. 3, with a source voltage VB (a rated voltage 12 V) supplied to the source line 30 which is connected to a battery. In addition, a constant voltage circuit 14 is connected to the source line 30 so that even if the source voltage VB fluctuates, a constant voltage Vs having a constant value (preferably approximately 5 V under normal circumstances) is output to a constant voltage line 31.

An output setting voltage VN which is in proportion to a rotation rate setting N set by a sliding resistor or the like that constitutes a rotation rate setting device that sets the rotation rate of the brushless motor is input to a non-inversion input terminal of an operational amplifier OP2, and the output from the operational amplifier OP2 which functions as a buffer is input to a non-inversion input terminal of an operational amplifier OP3.

The operational amplifier OP3, with resistors R3 and R4 connected to its inversion input terminal, constitutes a non-inversion amplifier circuit, and its output, which has been inverted and amplified, is input to an inversion input terminal of an operational amplifier OP4 which, connected with resistors R5 and R6, constitutes a non-inversion amplifier. Furthermore, a source voltage correction signal VC output by a source voltage correction circuit 16 is input to a non-inversion input terminal of the operational amplifier OP4.

In the source voltage correction circuit 16, a voltage Vca achieved by dividing the source voltage VB at resistors R1 and R2 is input to an operational amplifier OP1 which functions as a buffer, and the output of the operational amplifier OP1 runs to a charge/discharge circuit constituted of transistors TR1, TR2, TR3 and TR4 and resistors R7~R12. This charge/discharge circuit is turned on/off by the output duty signal Pd detailed below, and as the transistors TR1~TR4 are turned on/off, a capacitor C in an integrating circuit constituted of a resistor R13 and the capacitor C is charged and discharged to generate the source correction signal VC at the capacitor C.

To be more specific, when the output duty signal Pd output by an operational amplifier OP5 is set to on, the transistors TR1 and TR2 are in a continuous state between their respective collectors and emitters. This sets the transistor TR3 in a continuous state and sets the transistor TR4 in a non-continuous state, resulting in the voltage Vca, which is in proportion to the source voltage VB, charging the capacitor C, with the voltage at the capacitor C gradually increasing in correspondence to a time constant determined by the resistor R13 and the capacitor C from 0 V to Vca (V). In addition, when the output duty signal Pd is set to off, the transistors TR1 and TR2 are in a non-continuous state, thereby setting the transistor TR3 in a non-continuous state and the transistor TR4 in a continuous state. Consequently, the electrical charge at the capacitor C is discharged to the ground side via the transistor TR4 and the voltage at the capacitor C (the source voltage correction voltage VC) becomes gradually reduced in conformance to the time constant determined by the capacities at the resistor 13 and the capacitor C. While this source voltage correction voltage VC is turned to the on/off state in correspondence to the on/off of the output duty signal Pd, since the divided voltage Vca fluctuates in correspondence to fluctuations in the source voltage VB, the voltage output by the operational amplifier OP1 shifts upward when the source voltage VB becomes high and shifts downward when the source voltage VB becomes low.

The operational amplifier OP4 functioning as an inversion amplifier circuit outputs an output duty reference voltage Vd which is inverted and amplified by the output setting signal VN input to its non-inversion input terminal and the source voltage correction voltage VC input to its inversion input terminal. This output duty reference voltage Vd is input to the operational amplifier OP5 constituting a comparator where it is compared with a triangular wave signal Pt output by an oscillation circuit 20 and input to its non-inversion input terminal. Only when the value of the triangular wave signal Pt is larger than that of the output duty reference voltage Vd, is an output signal (an output duty signal Pd) output.

Figure 4:
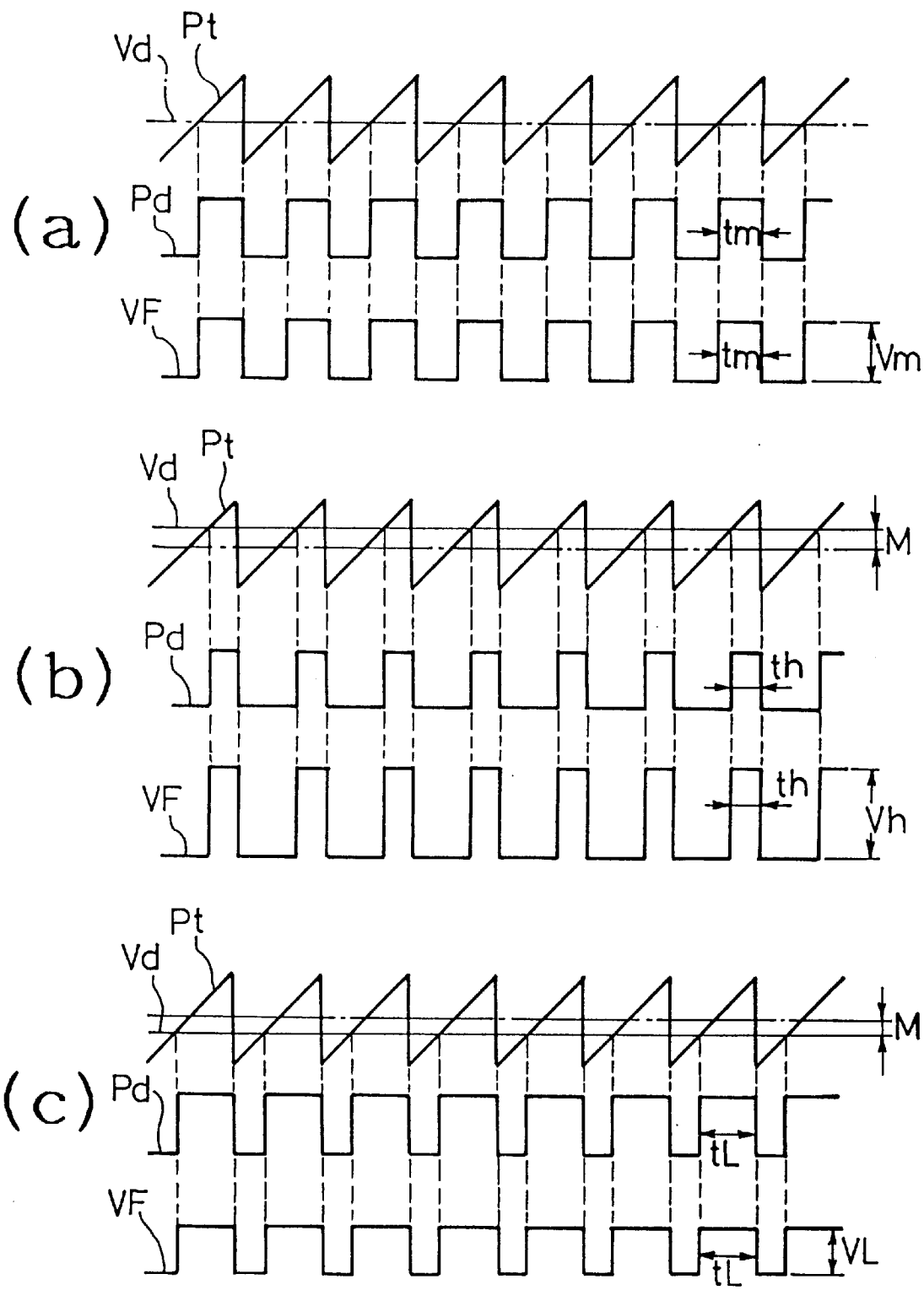
FIG. 4 presents timing charts illustrating the relationships among the output duty reference voltage Vd, the triangular wave signal Pt, the output duty signal Pd and the voltage VF applied to the individual coils or the individual field effect transistors, with FIG. 4A illustrating those when the source voltage is a rated voltage, FIG. 4B illustrating those when the source voltage shifts upward and FIG. 4C illustrating those when the source voltage has shifted downward.

Thus, since the output duty reference voltage Vd is increased by the correction quantity M achieved through the source voltage correction voltage VC when the source voltage VB has shifted upward, as shown in FIG. 4B, the pulse width th of the output duty signal Pd becomes reduced, whereas, since the output duty reference voltage Vd is reduced by the correction quantity M achieved through the source voltage correction voltage VC when the source voltage VB has shifted downward, as shown in FIG. 4C, the pulse width tL of the output duty signal Pd can be set wider.

As a result, the voltages VF applied to the individual coils U, V and W or the individual field effect transistors FETs 1~6 will include output voltages (Vm, Vh, VL) determined in correspondence to the source voltage VB and have the pulse widths (tm, th, tL) determined in correspondence to the output duty signal Pd. The pulse widths are changed in correspondence to fluctuations in the source voltage VB so that the output voltages (Vm, Vh, VL) and the pulse widths (tm, th, tL) determined by the output duty signal Pd maintain a relationship whereby the products of the output voltages (Vm, Vh, VL) and the pulse widths (tm, th, tL) are constant at all times (Vm×tm=Vh×th=VL×tL=constant). Consequently, the average voltage at the individual coils U, V and W or the individual field effect transistors, FETs 1~6 can be maintained at a constant value at all times, thereby making it possible to achieve stable rotation of the rotor 3. It is to be noted that FIG. 4A illustrates a situation in which the source voltage VB is a rated voltage (12 V), with output voltages (Vm, Vh, VL) of the voltages VF which fluctuate in correspondence to fluctuations in the source voltage VB having a relationship expressed as Vh>Vm>VL.

Figure 5:
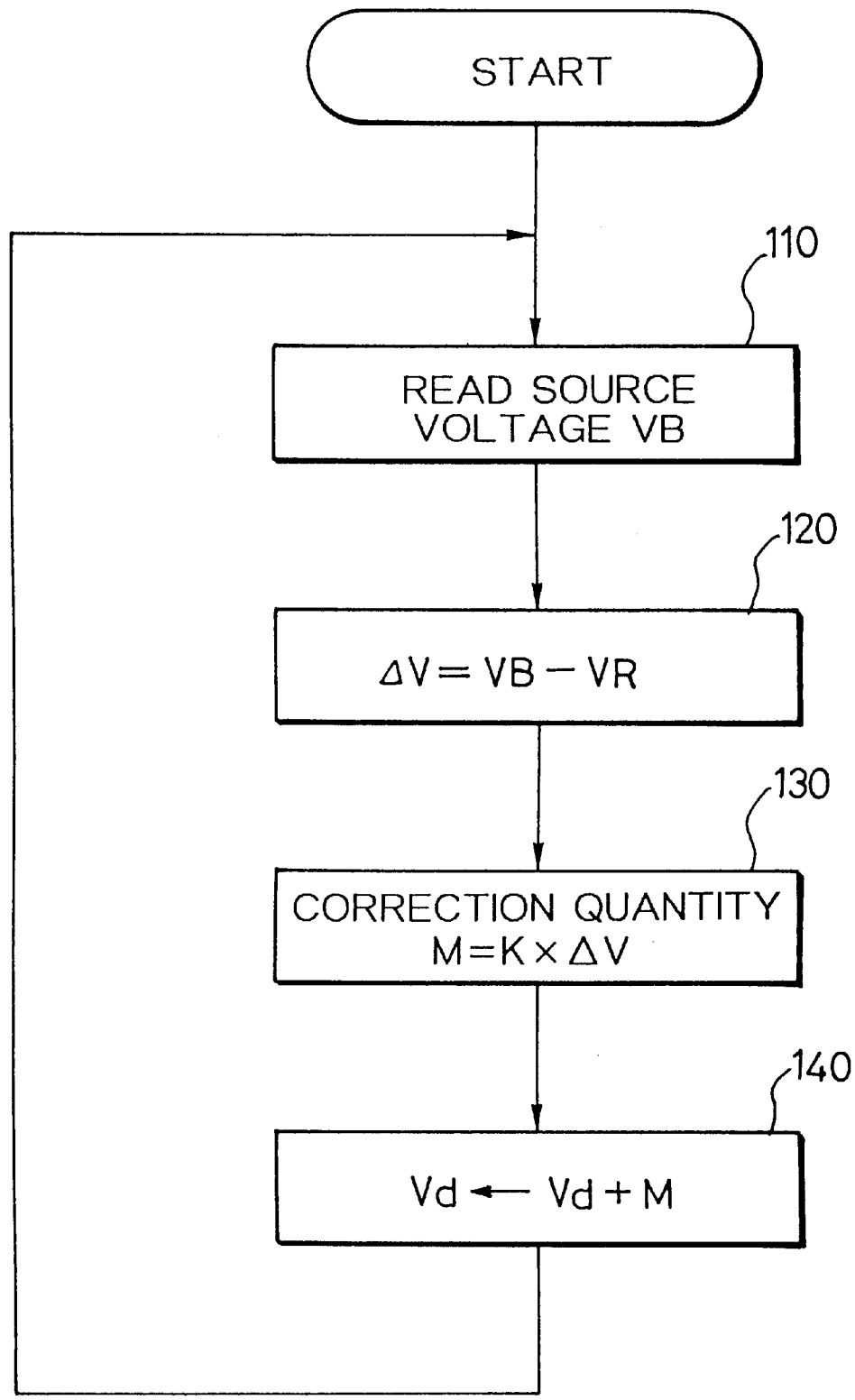
FIG. 5 is a flowchart illustrating the source voltage correction control.

When achieving a similar function to that provided by the source voltage correction circuit 16 through a microcomputer, the source voltage correction control, as illustrated in the flowchart in FIG. 5, for instance, may be implemented. In this source voltage correction control, first, the source voltage VB is read in step 110. Then, in step 120, the voltage difference (the fluctuation quantity) V between the source voltage VB and the rated voltage VR (12 V) is determined. In step 130, a correction quantity (correction voltage) M is calculated by multiplying the fluctuation quantity V by a specific conversion constant K. It is to be noted that the conversion constant K is calculated in advance to ensure that the products of the output voltages (Vm, Vh, VL) and the pulse widths (tm, th, tL) are constant at all times (Vm×tm=Vh×th=VL×tL=constant).

Next, in step 140, by adding the correction quantity for the output duty reference voltage Vd, the pulse width of the output duty signal Pd is corrected to a smaller width when the source voltage VB has shifted upward and is corrected to a larger width when the source voltage VB has shifted downward, thereby achieving control similar to that achieved through the circuits described above.

As has been explained, according to the present invention, since the pulse width of a drive pulse is corrected so that the average voltage per unit cycle of the drive pulse remains constant as the source voltage fluctuates, the rotating speed of the motor can be maintained at a constant, preset level over the entire rotating speed range in spite of fluctuations in the amplitude of the drive pulse caused by fluctuations in the source voltage.

In addition, even when the source voltage shifts upward while the motor is rotating at high speed, no excess voltage is applied, eliminating the concern of a melted fuse and damage to the motor which may be caused by fluctuating voltages and making it possible to provide a brushless motor with a high degree of reliability.

What is claimed is:

1. A drive control apparatus for use in controlling a brushless motor having a rotor with permanent magnets and a stator with exciting coils wound around the stator for supplying a rotating magnetic field to the rotor, said drive control apparatus comprising:

Hall elements to be located near the rotor, operable to detect a rotational position of the rotor and to produce output signals indicative of the rotational position of the rotor;

a switching device to be electrically connected to the exciting coils of the stator, operable to switch a direction of current to be supplied to the exciting coils of the stator;

a drive controller electrically connected to said Hall elements and said switching device, operable to control operation of said switching device based on the output signals from said Hall elements and to control a quantity of current to be supplied to the exciting coils by outputting drive pulses;

a setting device operable to set a desired rotation rate of the rotor and to output a setting signal indicative of the desired rotation rate set by said setting device;

a wave generator operable to generate and output triangular waves having a specific frequency;

a pulse width modulator operable to determine a pulse width of the drive pulses output by said drive controller by comparing the triangular waves output by said wave generator with a threshold value corresponding to the setting signal output by said setting device and to set, as the pulse width of the drive pulses, a value of a period during which an amplitude of the triangular waves is larger than the threshold value such that the pulse width is modulated so as to become narrower as the threshold value increases;

a source voltage fluctuation detector operable to detect a fluctuation of a source voltage; and a pulse width correction device operable to increase or decrease the threshold value in correspondence with the fluctuation of the source voltage when said source voltage detector detects the fluctuation of the source voltage such that the pulse width of the drive pulses is narrower when the source voltage is higher and the pulse width is wider when the source voltage is lower.

2. A drive control apparatus as claimed in claim 1, wherein said source voltage fluctuation detector comprises:

a constant voltage circuit operable to generate a constant voltage;

a source voltage divisional circuit operable to divide the source voltage at a specific proportion so as to output a proportioned voltage; and a comparison circuit operable to compare the constant voltage from said constant voltage circuit with the proportioned voltage from said source voltage divisional circuit.

3. A drive control apparatus as claimed in claim 1, wherein said pulse width correction device is operable to output a correction voltage corresponding to a quantity of fluctuation of the source voltage when said source voltage fluctuation detector detects that the source voltage has fluctuated, such that the threshold voltage is increased by the amount of the correction voltage when the source voltage increases and the threshold voltage is decreased by the amount of the correction voltage when the source voltage decreases.

4. A brushless motor system comprising:

a brushless motor having a rotor with permanent magnets and a stator with exciting coils wound around said stator for supplying a rotating magnetic field to said rotor;

Hall elements located near said rotor, operable to detect a rotational position of said rotor and to produce output signals indicative of the rotational position of said rotor;

a switching device electrically connected to said exciting coils of said stator, operable to switch a direction of current to be supplied to said exciting coils of said stator;

a drive controller electrically connected to said Hall elements and said switching device, operable to control operation of said switching device based on the output signals from said Hall elements and to control a quantity of current to be supplied to said exciting coils by outputting drive pulses;

a setting device operable to set a desired rotation rate of said rotor and to output a setting signal indicative of the desired rotation rate set by said setting device;

a wave generator operable to generate and output triangular waves having a specific frequency;

a pulse width modulator operable to determine a pulse width of the drive pulses output by said drive controller by comparing the triangular waves output by said wave generator with a threshold value corresponding to the setting signal output by said setting device and to set, as the pulse width of the drive pulses, a value of a period during which an amplitude of the triangular waves is larger than the threshold value such that the pulse width is modulated so as to become narrower as the threshold value increases;

a source voltage fluctuation detector operable to detect a fluctuation of a source voltage; and a pulse width correction device operable to increase or decrease the threshold value in correspondence with the fluctuation of the source voltage when said source voltage detector detects the fluctuation of the source voltage such that the pulse width of the drive pulses is narrower when the source voltage is higher and the pulse width is wider when the source voltage is lower.

5. A brushless motor system as claimed in claim 4, wherein said source voltage fluctuation detector comprises:

a constant voltage circuit operable to generate a constant voltage;

a source voltage divisional circuit operable to divide the source voltage at a specific proportion so as to output a proportioned voltage; and a comparison circuit operable to compare the constant voltage from said constant voltage circuit with the proportioned voltage from said source voltage divisional circuit.

6. A brushless motor system as claimed in claim 4, wherein said pulse width correction device is operable to output a correction voltage corresponding to a quantity of fluctuation of the source voltage when said source voltage fluctuation detector detects that the source voltage has fluctuated, such that the threshold voltage is increased by the amount of the correction voltage when the source voltage increases and the threshold voltage is decreased by the amount of the correction voltage when the source voltage decreases.

* * * * *